Nov. 10, 1959 W. O. BURKE 2,911,667
HINGE ASSEMBLY FOR CABINETS AND THE LIKE
Filed Oct. 17, 1957 2 Sheets-Sheet 1
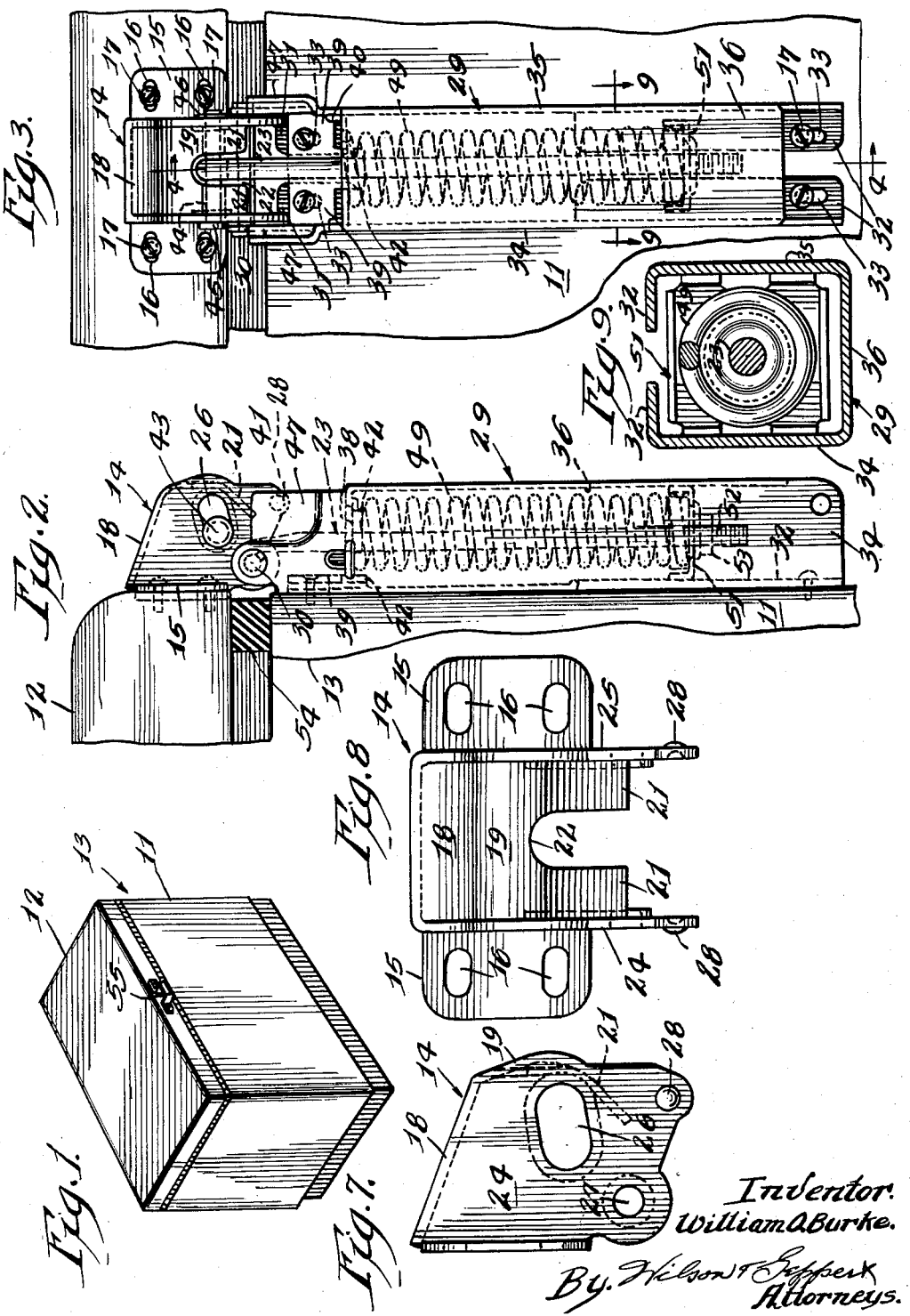
Inventor:
William O. Burke.
By Wilson & Ripperk
Attorneys.

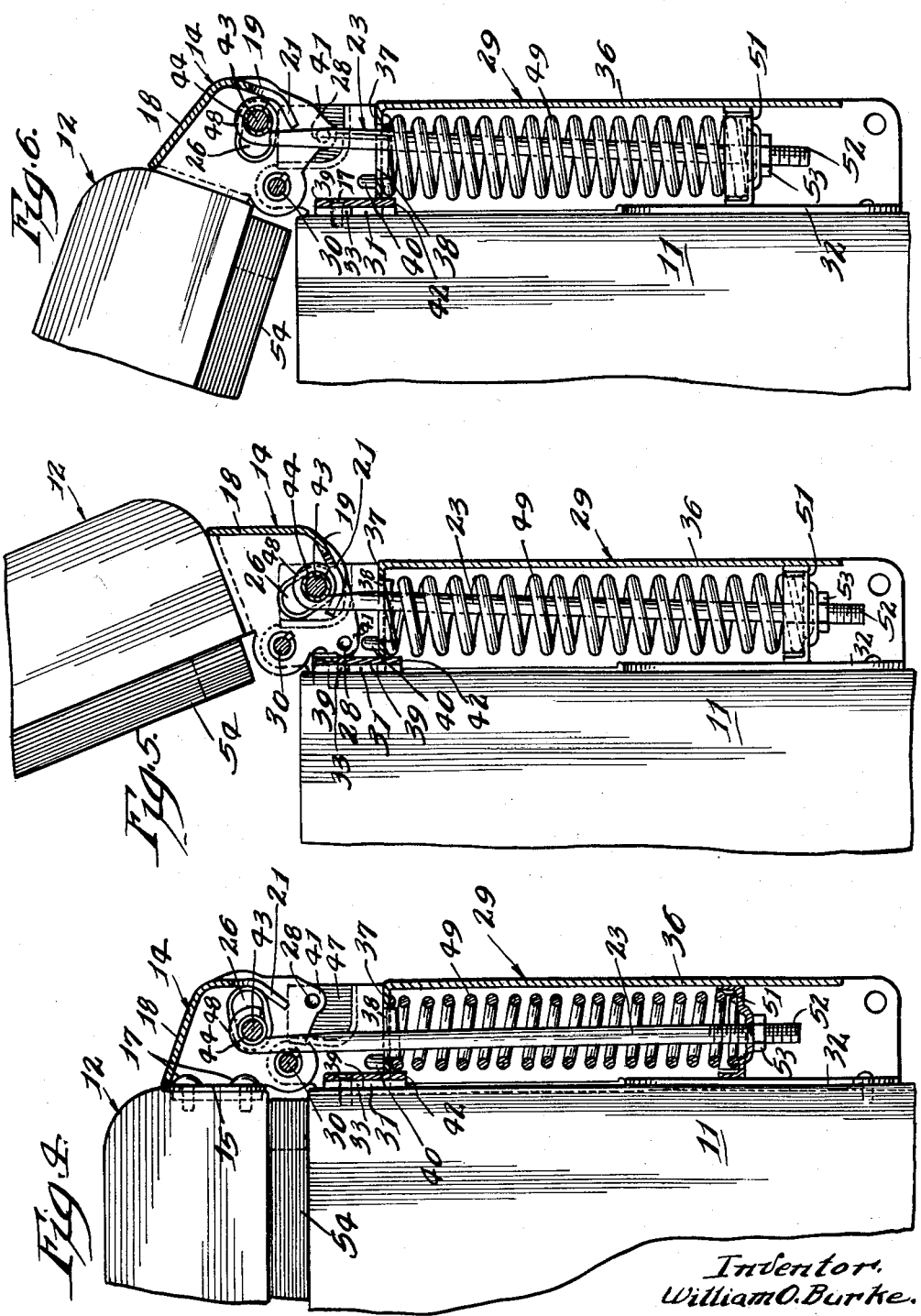

United States Patent Office 2,911,667
Patented Nov. 10, 1959

2,911,667

HINGE ASSEMBLY FOR CABINETS AND THE LIKE

William O. Burke, Rockford, Ill., assignor to National Lock Co., Rockford, Ill., a corporation of Delaware Application October 17, 1957, Serial No. 690,704

5 Claims. (Cl. 16—190)

The present invention relates to a novel hinge assembly for spring-loading the heavy lid or closure of a refrigerator or frozen food cabinet whereby to facilitate opening and closing of the lid and for retaining the lid closed and effectively sealed without the use of the usual lock or latch mechanism.

Among the objects of the present invention is the provision of a novel spring-loaded hinge assembly provided with a floating lever arm adapted to automatically decrease the counterbalancing effect of the spring as the lid is moved to closed position whereby a portion of the lid weight becomes effective to perform the sealing operation.

In the disclosed embodiment the counterbalancing effect of the spring-loaded hinge upon the lid is varied so that as the lid is moved to adjacent its closing position, the counterbalancing effect is decreased so that when the lid is closed sealing is effected and the lid remains closed without the necessity of latching mechanism. When the lid is again moved toward open position, the counterbalancing effect is again increased so as to retain the lid counterbalanced in open position and allow access to the contents of the container of the cabinet.

A further object of the present invention is the provision of a novel spring-loaded hinge construction for the lid of a refrigerator or frozen food cabinet in which the spring-loading of the relatively heavy lid varies between open and closed positions and in which the lid is maintained counterbalanced in an open position in which the housewife has ready access to the interior of the cabinet but when the lid is moved to closed position the counterbalancing effect is decreased so that the lid may be readily closed and retained closed and sealed without any latching means. While the counterbalancing effect is decreased as the lid is manually lowered, but little manual effort is required to again raise the lid and break the seal for but a portion of the lid weight is made available to effect sealing and retain the lid closed.

Another object of the present invention is the provision of a novel counterbalancing hinge assembly including a hinge wing affixed to the relatively heavy lid of a refrigerator or frozen food cabinet open at the top and with its lid pivotally mounted along the rear upper edge to the chest or container of the cabinet to which container is affixed a hinge base, a spring-loaded lever arm carried by the hinge base and connected to a retainer pin shiftable in such manner in the hinge wing that the lifting power of the lever arm is reduced as the lid is moved to closed position and in which position a portion of the weight of the lid effects a positive seal. As the lid is again raised from its closed position, the lifting power of the spring-loaded lever arm is again increased and balances the lid in open position.

By this novel construction and arrangement the manual raising and lowering of the relatively heavy lid is assisted so as to relieve the housewife or user of much of the manual effort required in obtaining access to the contents of the cabinet. Furthermore, the weighted lid is restrained from dropping and causing injury to the housewife or user, and the necessity of providing such a cabinet with latching mechanism to seal and maintain the lid closed is eliminated.

Further objects are to provide a construction of maximum simplicity, efficiency, economy and ease of assembly and operation, and such further objects, advantages and capabilities as will later more fully appear and are inherently possessed thereby.

The present invention is an improvement over that disclosed in my Patents Nos. 2,641,019 and 2,777,157.

In the drawings:

Figure 1 is a perspective view showing the front of a refrigerator or frozen food cabinet to the rear of which the novel balanced hinge assembly is affixed to the lid and container.

Fig. 2 is an enlarged view in end elevation of one of the novel hinges assembled upon the rear of the container and lid of a chest type refrigerator or frozen food cabinet, the lid being shown in closed position.

Fig. 3 is a view in rear elevation of the novel hinge assembly with the lid in closed position as in Fig. 2.

Fig. 4 is a view in vertical cross section taken approximately on the line 4—4 of Fig. 3 and viewed in the direction of the arrows.

Fig. 5 is a view in vertical cross section taken on the same plane as Fig. 4, but showing the hinge elements in the position they occupy when the lid is moved to fully open position.

Fig. 6 is a vertical cross sectional view similar to Fig. 5 but with the lid being moved to closed position.

Fig. 7 is a view in side elevation of the disassembled hinge wing.

Fig. 8 is a view in rear elevation of the hinge wing.

Fig. 9 is a view in horizontal cross section taken on the line 9—9 of Fig. 3 and viewed in the direction of the arrows.

Referring to the disclosure in the drawings in which is shown an illustrative embodiment of the present invention, the novel hinge assembly is shown mounted upon a container or chest 11 and a lid 12 of a chest-type refrigerator or frozen food cabinet 13, the lid being pivotally mounted at the rear as shown in Figs. 2 to 6, inclusive, and of substantial thickness and weight.

In refrigerators or frozen food cabinets of this general type, due to the weight and size of the insulated lid, substantial effort and leverage is required for the housewife or user to lift the lid to its partially or fully elevated or open position to retain it open and to lower the lid to its closed position, unless means are provided for balancing the weight of the lid.

In my prior Patent No. 2,777,157 of January 15, 1957, means are provided for counterbalancing the lid and assisting the housewife in the manual effort required in raising and lowering the heavy lid. However, such a hinge arrangement requires latching means to retain the lid closed and effect a tight seal between the lid and the chest or container. The present invention comprehends a novel hinge assembly for counterbalancing the lid in such manner that a portion of the lid weight is available to effect the proper sealing of the lid in closed position. To accomplish this the novel spring-loaded hinge is provided with a floating lever arm that automatically decreases the spring counterbalancing when the lid is moved to closed position, and the tension to develop counterbalancing action is again increased when the lid is moved to open position.

To accommodate the size and weight of the lid 12, two of the novel hinge assemblies are mounted at the rear of the cabinet 13 in suitably spaced relation, but any number may be provided as required. Each hinge assembly includes a hinge wing 14 having laterally projecting anchoring flanges 15 provided with spaced horizontal slots 16 for receiving attaching screws or bolts 17 whereby the hinge wing is affixed to the rear of the lid 12. The slots 16 being elongated permit lateral adjustment of the hinge wing 14 and facilitates assembly and alignment.

The hinge wing 14 as shown in detail in Figs. 7 and 8, is provided with a downwardly and rearwardly inclined top wall 18 merging into a rear wall 19 that is bent or curved downwardly and inwardly to provide spaced bifurcations 21 and a downwardly opening notch or recess 22 therebetween to receive a portion of the upper end of a hook bolt or lever arm 23 when the lid is elevated, and spaced side walls 24 and 25 from which project the anchoring flanges 15. Each of these side walls is provided with an elongated, extruded slot 26, an extruded opening 27 and an embossment 28, the slot 26, opening 27 and embossment 28 in the spaced sides being disposed in aligned relation.

A hinge base 29 is pivotally connected to the hinge wing 14 by a transverse pivot pin 30. This hinge base is affixed to the chest or container 11 by means of laterally projecting and vertically extending spaced inturned sets of anchoring flanges 31 and 32, each of said anchoring flanges provided with an elongated and longitudinally extending slot 33 for receiving an attaching screw or bolt 17. The lower set of anchoring flanges 32 project from spaced side walls 34 and 35 of the hinge base, with the rear wall 36 of this base stopping short of the lower end of the side walls. The rear wall 36 has an inturned flange forming a top plate 37 spaced from the upper ends of the side walls 34 and 35 with this flange provided with an elongated slot 38 through which projects the upper end of the lever arm or hook bolt 23 and permits the latter to move freely longitudinally as well as laterally in the slot. The inner end of this top plate 37 is retained against upward movement by an indentation 40 in each of the side walls 34 and 35.

A substantially T-shaped stop plate 39 is positioned inwardly of the upper, inturned anchoring flanges 31 and provided with openings adapted to be aligned with the elongated slots 33 of these flanges whereby this plate is retained in anchored position by the screws 17 that anchor the upper end of the base hinge 29 upon the rear of the chest 11. This plate 39 provides a stop against which the depending free edges 41 of the side walls 24 and 25 of the hinge wing 14 abut when the lid is in fully open position as shown in Fig. 5. The depending leg 42 of the plate 39 is conformably but adjustably received in a slot in the top plate 37 of the hinge base 29 with the elongated slots 33 permitting vertical adjustment of the hinge base 29.

A retainer pin 43 bridges the side walls 24 and 25 of the hinge wing 14 and adjacent each end is provided with a roller 44 projecting into a slot 26 in the side walls 24 and 25. This retainer pin is provided with a head 45 at one end and a washer 46 anchored on the other end for retaining this pin and its rollers 44 in the side walls 24 and 25, but permitting the pin and rollers to shift in the aligned slots 26. To accommodate or provide clearance for the head and washer when the lid is moved to open position (Fig. 5) the side walls 34 and 35 of the base hinge 29 are expanded at 47 as shown in Figs. 2 and 3.

The spring-loaded lever arm or hook bolt 23 is provided at its upper end with a hook 48 engaging the retainer pin 43 between the spaced rollers and intermediate its length this lever arm is encompassed by a coil spring 49. The upper end of this spring seats against the lower side of the top plate 37 of the hinge base 29, and the other or lower end thereof seats within a cup-shaped retainer plate 51 that is adjustably mounted upon the lower or depending end of the lever arm 23, the latter being threaded for a substantial portion of its length at 52. A nut 53 retains the retainer plate 51 in its adjusted position upon the lever arm whereby the coil spring 49 is retained under compression and counterbalances the relatively heavy lid 12. As shown in Fig. 9, the retainer plate 51 is conformably but slidably received within the confines of the hinge base 29 and permits vertical and lateral adjustment of the lever arm 23.

While the spring-loaded lever arm 23 counterbalances the lid 12, in the present invention this counterbalancing effect is varied by the shifting of the retainer pin 43 and its spaced rollers 44 in the slots 26. When the lid is closed as shown in Figs. 2 and 4, the pin and rollers are disposed in the forward ends of the slots 26 in which the counterbalancing effect of the spring-loaded lever arm 23 is decreased sufficiently that a portion of the lid weight is available to effect the proper seal through the encompassing sealing gasket 54 disposed between the lid and the adjacent upper wall of the chest or container 11 of the cabinet 13, and thereby eliminating the use of or necessity for latching mechanism to effect and maintain tight sealing engagement. A handle 55 may be provided for raising and lowering of the lid 12.

When the lid is elevated to approximately the position shown in Fig. 6, the retainer pin 43 and rollers 44 shift to the other or rear end of the slots 26 in which position the retaining pin 43 is furthest removed from the pivot pin 30 and the lid is counterbalanced in open position. In this position the embossments 28 on the side walls 24 and 25 of the hinge wing 14 frictionally engage the interior of the side walls 34 and 35 of the hinge base 29 to help in retaining the lid 12 in open position. As the lid is manually moved toward closed position and just prior to closing being effected, the slots 26 which incline rearwardly when in open position (Figs. 5 and 6) are moved beyond horizontal to the forwardly inclined position (Figs. 2 and 4) whereupon the retaining pin 43 and rollers 44 are moved downwardly and forwardly in the slots 26 to a position adjacent the pivot pin 30.

By this novel construction and arrangement of a spring-loaded hinge assembly, the floating lever arm 23 automatically decreases the spring counterbalancing when the lid is moved to closed position and increases this counterbalancing effect when the lid is opened.

Having thus disclosed the invention, I claim:

1. A spring-loaded hinge assembly for pivotally mounting about a horizonal axis a relatively heavy lid upon the container of a refrigerator cabinet, retaining the lid sealed when the lid is in closed position and counterbalancing the weight of said lid in partially or fully open position, comprising a hinge base affixed to the rear of the container, a hinge wing affixed to the lid and provided with spaced side walls pivotally connected to the upper end of the hinge base, an elongated slot in each of the side walls of said hinge wing with said slots provided in alignment and inclined downwardly toward the pivotal connection when the lid is closed and downwardly away therefrom when the lid is opened, a retainer pin bridging said side walls of the hinge wing with the ends thereof carried and movable in said aligned slots, and a spring-loaded lever arm in said hinge base with one end of said arm projecting into the hinge wing and thereat engaging the retainer pin, said pin being shiftable in said slots from one end when the lid is closed to the other end when the lid is opened to vary the balancing effect upon said lid.

2. A spring-loaded hinge assembly as set forth in claim 1, in which said retainer pin is shifted to one end of said slots and away from said pivotal connection when the lid is partially or fully open to counterbalance the weight of the lid and shifted to the other end of the slots and toward said pivotal connection when the lid is moved to closed position to decrease the spring-loading of the hinge whereby a portion of the lid weight effects sealing contact between the lid and the container.

3. A spring-loaded hinge assembly as set forth in claim 1, in which said retainer pin is provided at each end with a roller received in one of said slots and said rollers and retainer pin are shifted to one end of said slots and away from said pivotal connection when the lid is open to counterbalance the weight of the lid and shifted to the other end of the slots and toward said pivotal connection when the lid is moved to closed position to decrease the spring-loading of the hinge whereby a portion of the lid weight effects sealing contact between the lid and the container.

4. In a refrigerator having a container open at the top and a relatively heavy and pivotally mounted lid providing an air-tight closure for said container when the lid is lowered to closed position, a hinge assembly comprising a hinge base mounted upon the container at the rear thereof and a hinge wing mounted upon the lid at the rear thereof, a spring-loaded lever arm in said hinge base having one end projecting into the hinge wing, said hinge wing having spaced side walls, a hinge pin for pivotally connecting the hinge wing and hinge base and pivotally mounting the lid upon the container, an elongated slot in each of said side walls spaced from said hinge pin with the slots arranged in aligned relation and inclined downwardly toward the hinge pin when the lid is closed, and a retainer pin carried in and shiftable in said aligned slots with one end of said spring-loaded lever arm attached to said retainer pin and said retainer pin moved to one position in said slots and away from said hinge pin when the lid is opened with said spring-loaded lever arm balancing the weight of said lid in its partially or fully open positions, and moved to another position in said slots and toward said hinge pin when the lid is moved to closed position in which the balancing effect of said spring-loaded lever arm is decreased and a portion of the weight of the lid is effective to seal the lid upon the container.

5. In a refrigerator having a container open at the top and a relatively heavy and pivotally mounted lid providing an air-tight closure for said container when the lid is lowered to closed position, a hinge assembly for retaining the lid counterbalanced when in partially or fully open position and retaining the lid sealed when in closed position comprising a hinge base mounted upon the container at the rear thereof and a hinge wing mounted upon the lid at the rear thereof, means for pivotally connecting said hinge wing to said hinge base, a spring-loaded lever arm in said hinge base having one end projecting into the hinge wing, said hinge wing having spaced side walls each provided with an elongated slot spaced from said pivotal connection with the slots arranged in aligned relation and inclined downwardly toward the pivotal connection when the lid is closed and in the opposite direction when the lid is opened, and a retainer pin carried in and shiftable in said aligned slots with one end of said spring-loaded lever arm attached to said retainer pin with said retainer pin moved to one end of said slots and away from the pivotal connection when the lid is opened and said spring-loaded lever arm balancing the weight of said lid when partially or fully open, and moved to the other end of said slots and toward said pivotal connection when the lid is moved to closed position in which the balancing effect of said spring-loaded lever arm is decreased and a portion of the weight of the lid is effective to seal the lid upon the container.

References Cited in the file of this patent

UNITED STATES PATENTS

| | | |
|---|---|---|
| 2,316,302 | Van Dyk et al. | Apr. 13, 1943 |
| 2,641,019 | Burke | June 9, 1953 |
| 2,726,914 | Allen | Dec. 13, 1955 |
| 2,777,157 | Burke | Jan. 15, 1957 |